United States Patent [19]

Hoffman

[11] Patent Number: 4,768,545
[45] Date of Patent: Sep. 6, 1988

[54] ACTUATOR FOR AIR CONDITIONING SYSTEM

[75] Inventor: Donald E. Hoffman, Java Center, N.Y.

[73] Assignee: General Motors Corporation, Detroit, Mich.

[21] Appl. No.: 121,403

[22] Filed: Nov. 16, 1987

Related U.S. Application Data

[63] Continuation-in-part of Ser. No. 12,389, Feb. 9, 1987, abandoned.

[51] Int. Cl.$^4$ .......................... F16K 27/00; F16B 7/20
[52] U.S. Cl. ..................................... 137/315; 92/128; 137/15; 251/31; 251/231; 403/349
[58] Field of Search .......................... 137/315, 15, 212; 251/58, 63.4, 88, 31, 231; 92/128; 403/287, 349

Primary Examiner—Martin P. Schwadron
Assistant Examiner—Stephen M. Hepperle
Attorney, Agent, or Firm—R. L. Phillips

[57] ABSTRACT

An air conditioner assembly of the type including an air flow housing, an air flow valve rotatably mounted in the housing, and an actuator mounted on the housing. The actuator includes a rod extending therefrom. The rod and valve include first and second complementary connector parts, respectively. The second connector part is connectable with the first connector part by rotation of the actuator through approximately 90° about the axis of the rod from a first orientation to a second orientation. The assembly includes a first bayonet coupling on the housing and a second bayonet coupling on the actuator for coupling the actuator to the housing. The bayonet couplers are complementary to each other and are operatively aligned with each other when the first and second connecting parts are in engagement with the actuator in the first orientation whereby the actuator may be mounted on the housing and the connector parts may be connected by rotation of the actuator from the first orientation to the second orientation.

21 Claims, 5 Drawing Sheets

ACTUATOR FOR AIR CONDITIONING SYSTEM

This is a continuation-in-part of U.S. patent application Ser. No. 012,389 now abandoned, filed Feb. 9, 1987.

TECHNICAL FIELD

This invention relates to vacuum actuators for use in combination with an automotive air conditioning system. More specifically, the invention relates to an actuator for operating an air valve of an air conditioning system.

BACKGROUND ART

Automotive air conditioning systems include a housing defining air flow passageways. Valves control the flow of air through the passageways. One type of valve assembly is mounted for rotation between a closed condition and an open condition wherein the valve rotates along its longitudinal axis and opens the air flow passageway.

Typically, actuators of both the vacuum motor type and Bowden wire type are utilized to actuate the movement of the valve between the open and closed conditions. Such actuators are generally mounted on the air conditioning housing and include a rod which extends through the housing and is coupled to the valve.

One currently preferred practice is to mount the actuator on the air conditioning housing by thread cutting nuts mounted on two molded studs. The driven rod extending from the actuator is connected to the air flow valve by a hook shaped projection extending from the valve. The driven rod includes a terminal portion having an opening through which the hook shaped arm is disposed. During the mounting operation of the actuator on the mounting surface of the housing wall, the connection requires a 90° twist or rotation motion of the actuator to hook the terminal member of the driven rod on the hook shaped projection. This is a cumbersome operation requiring the several steps of connecting the terminal member to the hook shaped projection and mounting the nuts on the two molded studs.

The object of the present invention is to overcome the difficulties of assembling the prior art assemblies. More particularly, it is an object of the present invention to not require the cumbersome operation requiring the several steps of connecting the terminal member to the hook member of the prior art.

SUMMARY OF THE INVENTION

The present invention provides an air conditioner assembly including an air flow housing, an air flow valve rotatably mounted in the housing, and an actuator which is simultaneously connected to the housing and the air flow valve by rotation of the actuator.

In carrying out the invention, the actuator includes a driven rod and connector means for connecting the rod to the valve. The connector means includes first and second complementary connector parts on the valve and rod respectively. The second connector part is connectable with the first connector part by rotation of the actuator through about the axis of the rod from a first orientation to a second orientation. The assembly includes a first bayonet coupling means on the housing and a second bayonet coupling means on the actuator for coupling the actuator to the housing. The first and second bayonet coupling means are complementary to each other and are operatively aligned with each other when the first and second connecting parts are in engagement with the actuator in the first orientation whereby the actuator may be mounted on the housing and the connector parts may be connected by rotation of the actuator from the first orientation to the second orientation.

FIGURES IN THE DRAWINGS

Other advantages of the present invention will be readily appreciated as the same becomes completely understood by reference to the following detailed description when considered in connection with the accompanying drawings wherein.

Detailed Description of the Drawing

Figure 1:
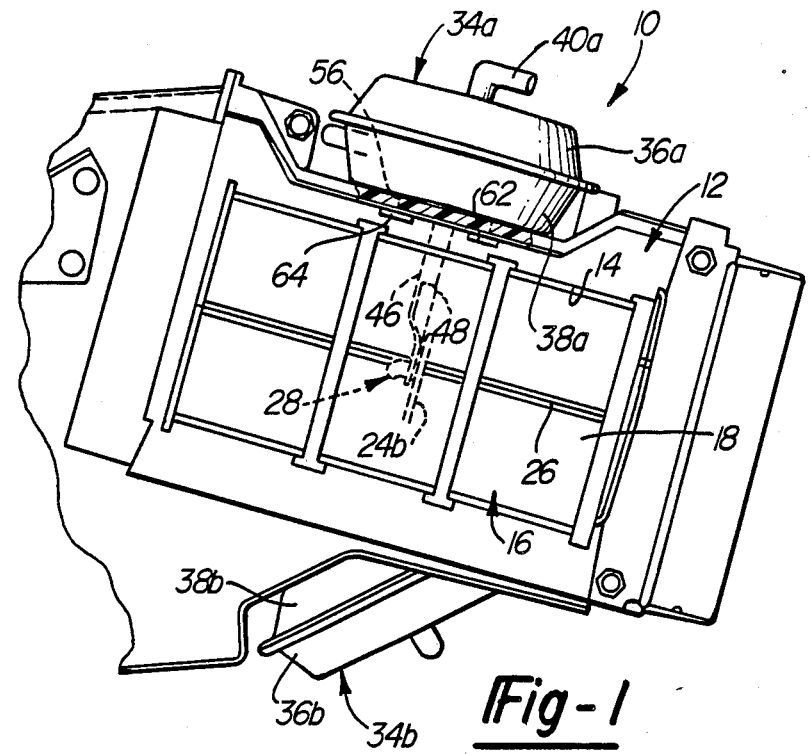
FIG. 1 is a side view partially broken away of an air conditioner assembly including a vacuum actuator all constructed in accordance with the present invention.

An air conditioner assembly constructed in accordance with the present invention is generally shown at 10 in the drawings. The assembly 10 includes a system housing generally indicated at 12 containing an air flow chamber having at least one port 14 extending through the system housing 12.

A valve member, generally indicated at 16, is mounted on the system housing 12 for rotation about its longitudinal axis to selectively open and close the port 14 to air flow. The air flow valve 16 includes a shield portion 18 for blocking air flow through the port 14 when the valve 16 is in the closed condition. The shield 18 is supported for rotation by axle projections 20 rotatably secured on a mounting surface 22. A plurality of vanes 24a, 24b interconnect the shield 18 to a central axle 26, the central axle 26 defining the longitudinal axis about which the air flow valve 16 rotates.

Figure 3:
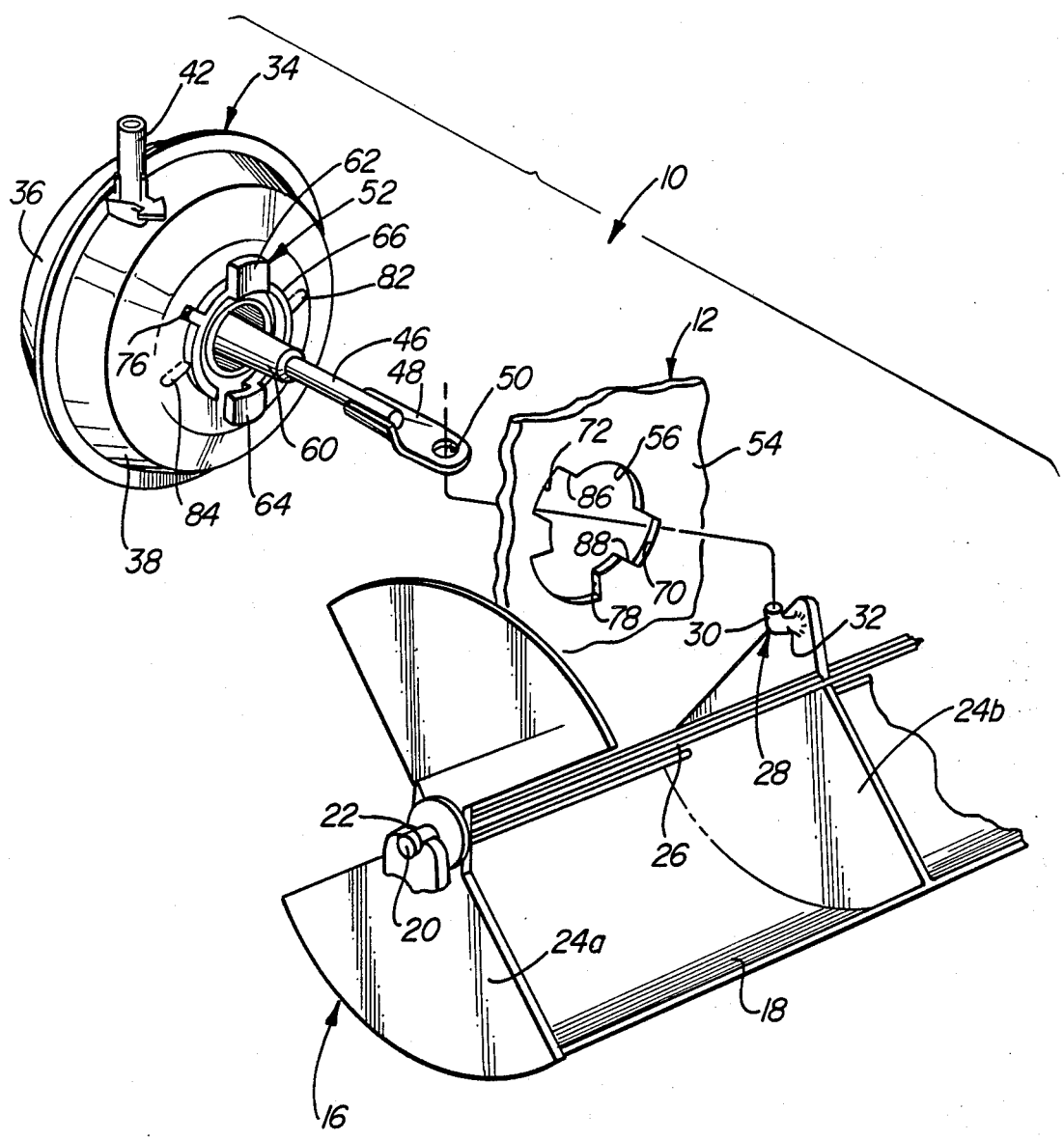
FIG. 3 is an exploded view of the vacuum actuator, mounting surface, and air flow valve.

The air flow valve 16 includes a first connector part comprising a hook shaped arm generally indicated at 28 extending therefrom. The hook shaped arm 28 has an end portion 30 and a body portion 32 which is parallel to the longitudinal axis of the air flow valve 16. As shown in FIG. 3, the hook shaped arm 28 extends outwardly from the vane 24b, the body portion 32 extending parallel to the axis defined by the axle 26. The end portion 30 extends perpendicularly relative to and away from the axle 26.

The assembly 10 includes a vacuum operated valve actuator generally indicated at 34 for actuating the movement of the air flow valve 16 between the open and closed conditions. As shown in FIG. 1, the assembly 10 can include several actuators 34a, 34b for the actuation of several air flow valve 16 disposed throughout the system housing 12. In FIG. 1, the several actuators are designated by the letters a, b as to their like parts.

Figure 2:
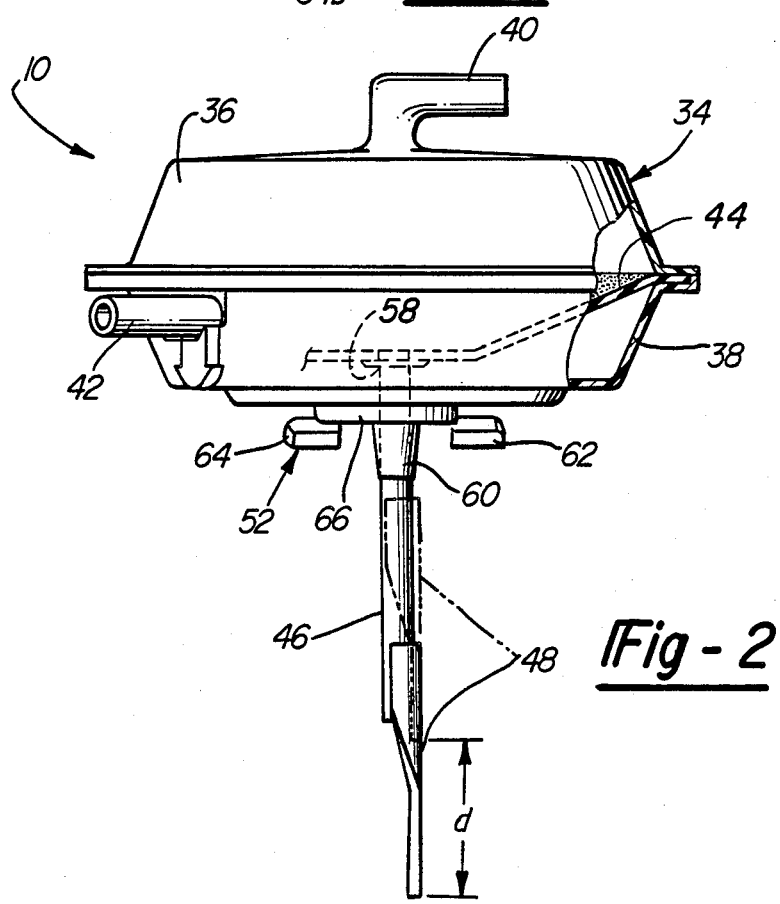
FIG. 2 is a side elevational view of the vacuum actuator showing the extent of movement of the driven rod.

Referring to FIG. 2, the actuator 34 generally comprises a two part housing including housing halves 36, 38. Housing half 36 includes a fluid inlet 40 and housing half 38 includes a fluid inlet 42. A flexible diaphragm 44 is mounted between the housing halves 36, 38 and defines two compartments within the housing halves 36, 38.

The fluid inlets 40, 42 are adapted to be connected by hoses to a fluid source for actuating movement of the diaphragm 44 within the housing halves 36, 38. Movement of the diaphragm 44 is actuated by selective inflow and outflow of fluid from the actuator 34 and through the inlets 40, 42.

The actuator 34 includes a driven rod 46. The driven rod 46 includes a terminal member 48 connected to the end thereof, such as by welding or other means well known in the art. The terminal member 48 includes an opening 50 extending therethrough. The opening 50 is perpendicular relative to the axis defined by the length of the driven rod 46. The terminal member 48 connects the rod 46 to the hook shaped arm 28.

The actuator 34 includes a rotationally actuated first bayonet coupler generally indicated at 52 for connecting the actuator 34 to a mounting surface 54 of the system housing 12. The bayonet coupler 52 extends through an opening 56 in the mounting surface 54 and has an axis of rotation defined by the length of the driven rod 46 when the rod 46 is in a neutral position. The bayonet coupler 52 is complementary to the opening 56 in the mounting surface 54. In a first orientation, the bayonet coupler 52 and opening 56 are operatively aligned and the opening 50 of the terminal member 48 is in engagement with the hook shaped arm 28. The actuator 34 is mounted on the mounting surface 54 and the terminal member 48 and hooked shaped arm 28 are connected by rotation of the actuator 34 from the first orientation through a 90° rotation to a second orientation.

Generally, the bayonet coupler 52 has an unlocked condition when the actuation is in the first orientation. The actuator 34 is free to rotate in the opening 56 as the end portion 30 of the hook shaped arm 28 extends partially through the opening 50 in the terminal member 48. The bayonet coupler 52 has a locked condition when the actuator is in the second orientation. In the locked condition, the bayonet coupler 52 engages the mounting surface 54 and the body portion 32 of the hook shaped arm 28 extends through the opening 50 in the terminal member 48. A single rotation of the actuator 34 connects the bayonet coupler 52 to the mounting surface 54 while simultaneously mounting the terminal member 48 on the base portion 32 of the hook shaped arm 28. When the terminal member 48 is mounted on the base portion 32 of the hook shaped arm 28, axial movement of the arm 46 is translated through the connection of the terminal member 48 to the hook shaped arm 28 to rotational motion of the valve member 16. Accordingly, fluid actuation of the diaphragm results in movement of the valve between open and closed conditions.

The driven rod 46 is connected to the diaphragm 44 at portion 58 of the diaphragm 44. The flexible diaphragm connection 58 provides what is effectively a swivel connector means for connecting the driven rod 46 to the actuator 34 such that there is swiveling movement of the driven rod 46 relative to the actuator 34. This swiveling movement is utilized in initially aligning the rod 46 and opening 50 with the hook shaped arm 28.

A boot 60 perfects a seal between the rod 46 and the actuator housing half 38. As fluid flows in and out of the chambers within the actuator 34 the driven rod 46 is actuated to move axially. The boot 60 is pleated to allow for the axial movement of the driven rod 46 as well as the swiveling movement of the driven rod 46. The combination of the swiveling and axial movement of the driven rod 46 with the twisting action of the bayonet coupler 52 provides the simple means of connecting the actuator housing 34 to the mounting surface 54 simultaneously with the connection of the terminal member 48 to the hook shaped arm 28.

The bayonet coupler 52 includes a pair of arms 62, 64 for engaging the mounting surface 54 and for drawing the actuator housing 36, 38 against the mounting surface 54. The arms 62, 64 draw the housing half 38 against the mounting surface 54 to insure a tight fit of the actuator 34 to the housing surface 12. This connection minimizes any loss of air due to loose fits, eliminates rattles in the system, and eliminates any lost travel for the valve operation.

The housing halves 36, 38 are molded plastic. The arms 62, 64 are integral parts of the molded housing half 38. The arms 62, 64 are somewhat yieldable for providing a biasing force to engage the housing half 38 against the mounting surface 54.

The bayonet coupler 52 includes a neck portion 66 projecting from the actuator housing half 38 and through the opening 56 in the mounting surface 54. The arms 62, 64 extend radially outwardly from the neck portion 66 and are spaced from the surface of the actuator housing half 38. The mounting surface 54 is engaged between the arms 62, 64 and the actuator housing half 38.

Figure 4:
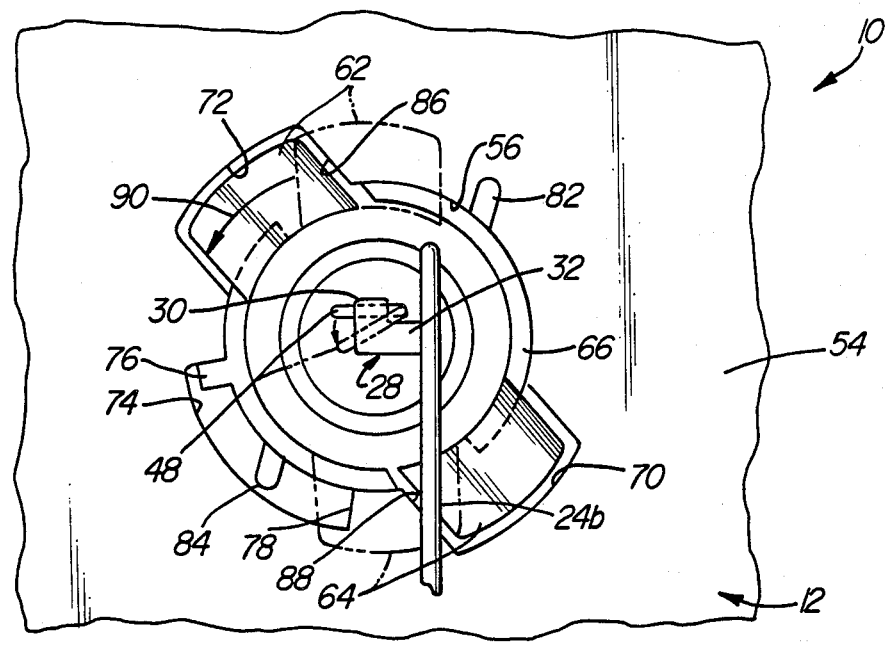
FIG. 4 is a plan view of the vacuum actuator in the first and intermediate orientations.
Figure 5:
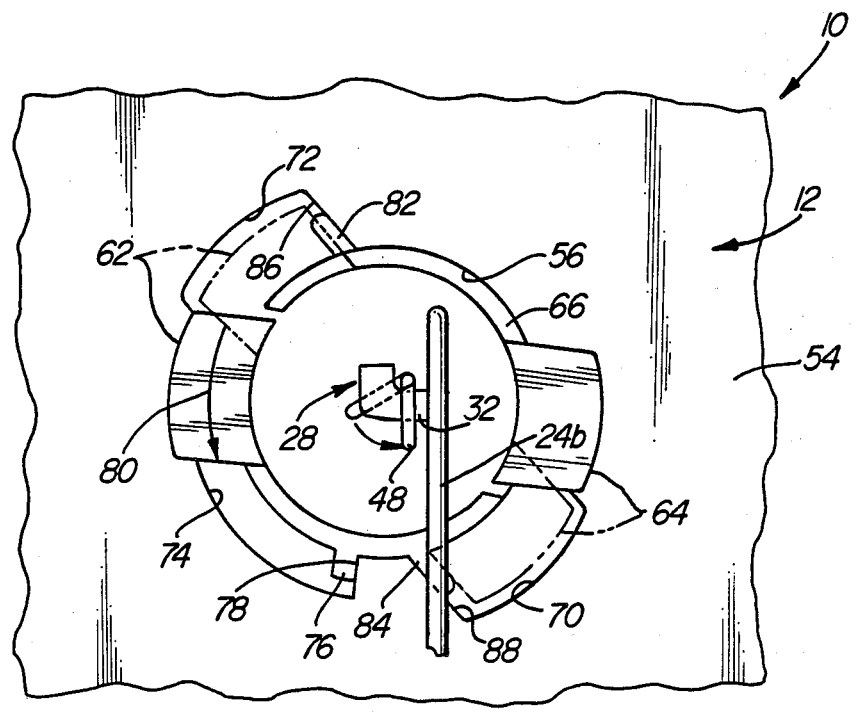
FIG. 5 is a plan view of the vacuum actuator housing mounted on the mounting surface being moved from the intermediate to the second orientation.
Figure 9:
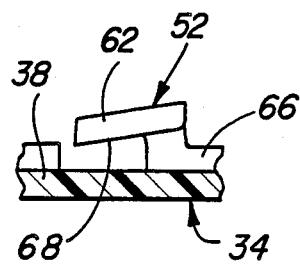
FIG. 9 is a fragmentary cross sectional view taken substantially along lines 9—9 of FIG. 8.
Figure 10:
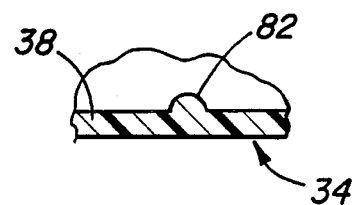
FIG. 10 is a fragmentary cross sectional view taken substantially along lines 10—10 of FIG. 8.

As shown in FIG. 9, each arm 62, 64 (arm 64 not shown) has an inclined surface 68 facing the actuator housing half 38 for camming the actuator housing half 38 against the mounting surface 54 as the bayone coupler 52 is rotated from the unlocked condition as shown in FIG. 4 in solid lines to the locked condition as shown in FIG. 5 in solid lines. The inclined surfaces 68 contribute to the perfection of the engagement fit of the housing half 38 with the mounting surface 54. The arms 62, 64 further compensate for the thickness tolerance variation of the mounting surface 54 and the tolerance variation between the surface of the housing half 38 and the tapered surface 68 of the flexible arms 62, 64.

The opening 56 in the mounting surface 54 includes a pair of first sections of increased radius 70, 72 which are complementary in shape to the flexible arms 62, 64. The sections 70, 72 allow the insertion of the flexible arms 62, 64 and neck portion 66 through the opening 56 when the bayonet coupler 52 is in the unlocked condition.

The assembly 10 includes means for locking the bayonet coupler 52 from rotation when the actuator 34 is in the second orientation. The locking means includes a third section of increased radius 74 in the opening 56 through the mounting surface 54. A tab 76 extends radially outwardly from the neck portion 66 for engaging an abutment surface 78 of the second recess. The surface 78 faces opposite to the direction of rotation of the bayonet coupler 52 when the actuator moves from the first orientation to the second orientation as shown by the arrow 80 in FIG. 5.

The locking means further includes a pair of detents 82, 84 extending from the actuator housing half 38 for engaging shoulders 86, 88, respectively, of the first pair of sections 70, 72. The shoulders 86, 88 face in the direction of rotation of the actuator 34 when moving from the first orientation to the second orientation. The tab 76 and detents 82, 84 engage oppositely facing surfaces (shoulders) 78, 86, 88, respectively, to prevent rotation in either direction of the actuator 34 relative to the mounting surface 54 and valve member 16 when in the second orientation.

Figure 6:
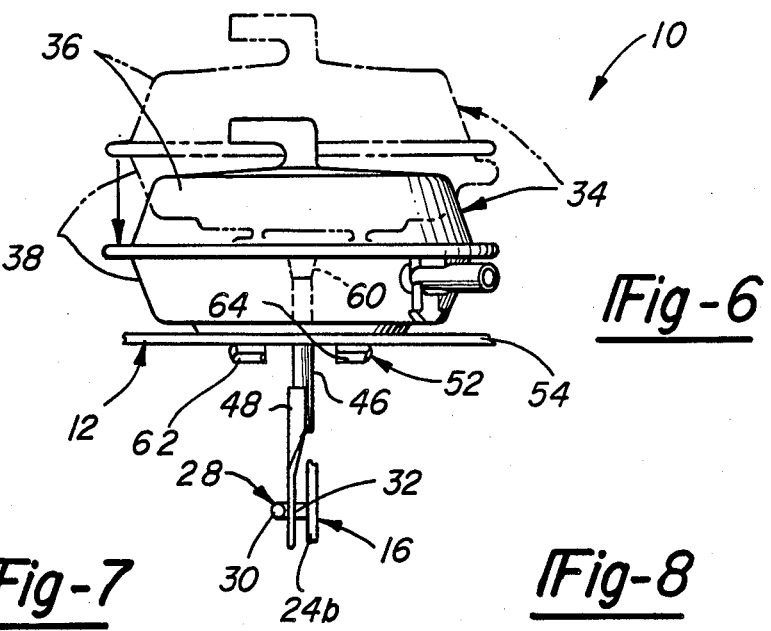
FIG. 6 is a side elevational view showing the insertion of the bayonet coupling means of the vacuum actuator housing through the opening in the mounting surface.
Figure 7:
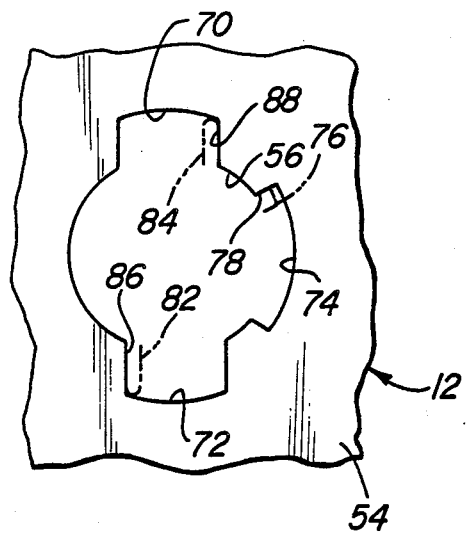
FIG. 7 is a fragmentary view of the mounting surface.
Figure 8:
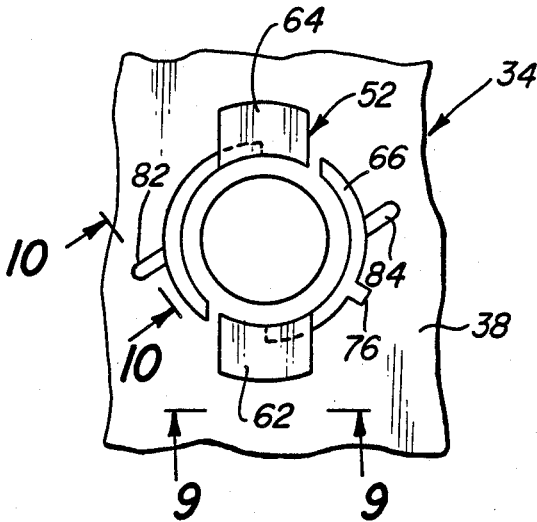
FIG. 8 is a plan view of the bayonet coupling means of the vacuum actuator housing.

As shown in FIGS. 2 and 6, the axial movement of the driven rod 46 through the distance d allows the housing 36, 38 to be moved axially as the neck portion 66 and flexible arms 62, 64 are inserted through the opening 56.

Referring to FIG. 4, when the assembly 10 is in the first orientation as shown in hatched lines in FIG. 4, the end portion 30 of the hook shaped arm 28 is substantially perpendicular relative to the axis of rotation of the bayonet connector 52 as defined by the length of the driven rod 46. The flexible arms 62, 64 are spaced 30° from the first pair of sections 70, 72 and the detents 76 are spaced 90° from the shoulders 86, 88. The tab 76 is spaced 90° from the abutment surface 78. The assembly 10 has an intermediate orientation as shown in solid lines in FIG. 4 wherein the end portion 30 of the hook shaped arm 28 extends partially through the opening 50 in the terminal member 48 and the arms 62, 64 mate with the first pair of sections of increased radii 70, 72. The detents 82, 84 and the tab 76 are spaced 60° from the surfaces 86, 88, 76, respectively.

In the second orientation, the arms 62, 64 engage the mounting surface 54. The tab 76 engages the abutment surface 78 and the detents 82, 84 engage the shoulders 86, 88.

Figure 11:
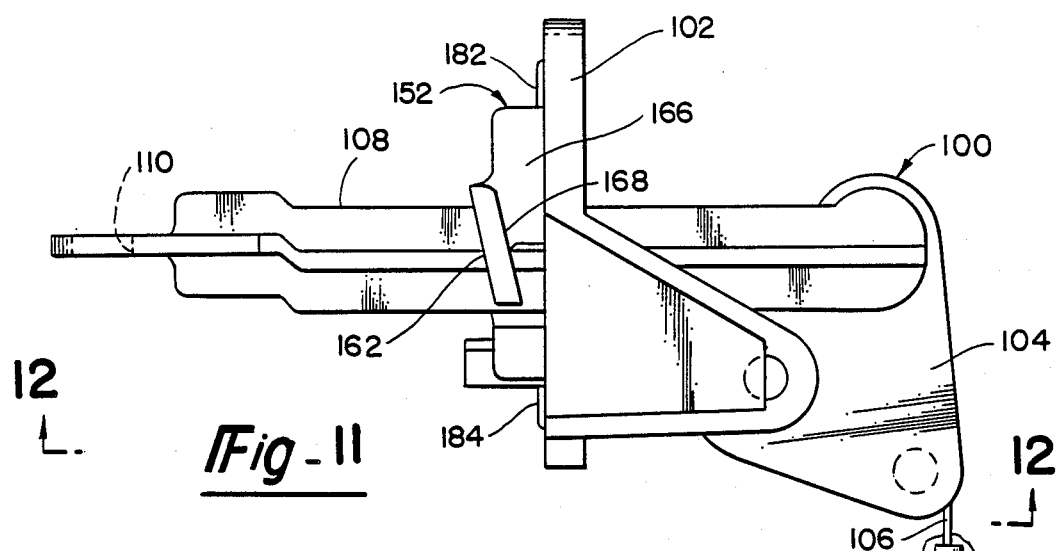
FIG. 11 is a side elevational view of a Bowden wire actuator constructed in accordance with the present invention.
Figure 12:
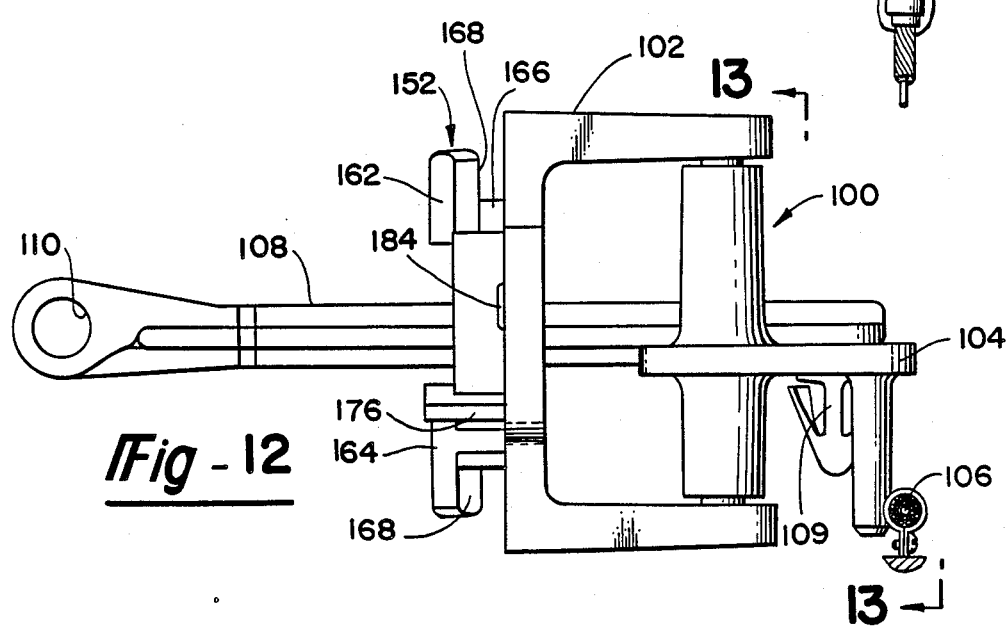
FIG. 12 is a side elevational view of the Bowden wire actuator taken along the line 12—12 in FIG. 11.
Figure 13:
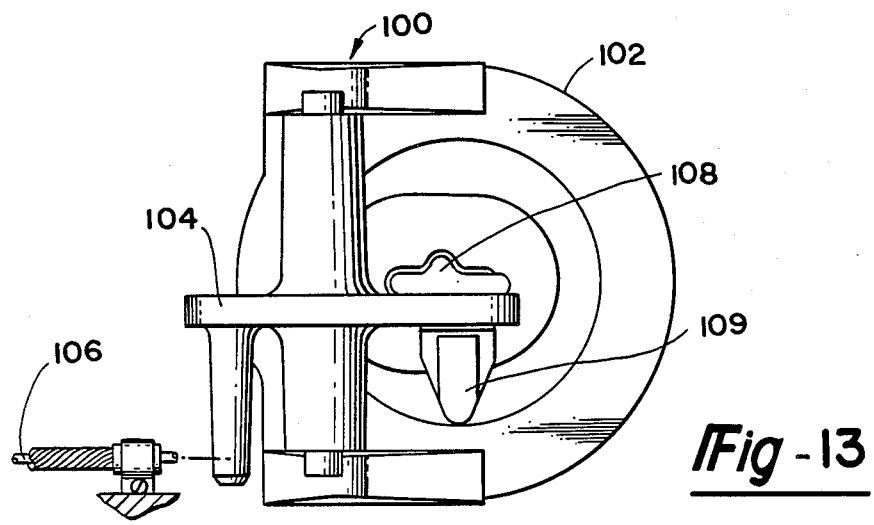
FIG. 13 is an end view of the Bowden wire actuator taken along the line 13—13 in FIG. 12.

Referring now to FIGS. 11-13, there is shown a Bowden wire actuator 100 similarly adapted for mounting on the housing 12 using the opening 56 previously described. The actuator 100 comprises a base 102 supporting a crank arm 104 that is connected to and turned by a remotely controlled Bowden wire 106 to translate a driven rod 108 made of plastic. The rod 108 is pivotally connected at one end to the crank arm by an integral bayonet pin 109 of conventional design and is connectable at an opposite end by a hole 110 therein to the hook shaped arm 28 of the valve 16 like the vacuum actuator driven rod previously described.

Also like the vacuum actuator previously described, the base 102 of the Bowden wire actuator is formed with a rotationally actuated bayonet coupler 152 having a pair of arms 162, 164 and neck portion 166 like the bayonet coupler 52 previously described. The arms 162 and 164 each have an inclined surface 168 on their rear side and there is further provided a radial tab 176 and detents 182 and 184 on the actuator base 102 also like the bayonet coupler 52 previously described for camming and locking the actuator to the air flow housing while causing the actuator rod to connect with the valve like before using the special opening 56 formed therein.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. An air conditioner assembly of the type comprising: an air flow housing; an air flow valve rotatably mounted in said housing; an actuator mounted on said housing including a driven rod, connector means for connecting said rod to said valve including first and second complementary connector parts on said valve and said rod respectively, said second connector part being connectable with said first connector part by rotation of said actuator about the axis of said rod from a first orientation to a second orientation, the improvement comprising a first bayonet coupling means on said housing and a second bayonet coupling means on said actuator for coupling said actuator to said housing, said first and second bayonet coupling means being complementary to each other and being operatively associated with each other when said first and second connecting parts are in engagement when said actuator is in said first orientation whereby said actuator may be mounted on said housing and said connector parts may be connected by rotation of said actuator from said first orientation to said second orientation, and said first and second bayonet coupling means being misaligned in said first orientation and operatively aligned in an intermediate orientation between said first and second orientation whereby rotation of said actuator from said first orientation to said intermediate orientation provides a preliminary coupling between said first and second connector parts and rotation between said intermediate orientation to said second orientation provides a coupling between said first and second bayonet coupling means and completes the coupling between said first and connector parts.

2. An assembly as set forth in claim 1 including swivel means for connecting said driven rod to said actuator to effect swiveling movement of said driven rod relative to said actuator.

3. An assembly as set forth in claim 1 wherein said actuator includes an actuator housing having an inner chanber and a diaphragm separating said inner chamber into two compartments and a first fluid passageway in fluid communication with a first of said compartments, said driven rod being connected to said diaphragm and extending through and out from a second of said two compartments, said driven rod being axially movable with said diaphragm.

4. An assembly as set forth in claim 3, including a second fluid passageway in fluid communication with said second compartment and boot means for perfecting a flexible seal between said actuator housing and said driven rod while allowing swiveling and axial movement of said driven rod relative to said actuator housing.

5. An assembly as set forth in claim 1, wherein said air flow housing includes a mounting surface having an opening extending therethrough, said first bayonet coupling means including at least one arm engaging said mounting surface for drawing said actuator housing against said mounting surface to diminish air flow therebetween.

6. An assembly as set forth in claim 5, wherein said bayonet coupling means includes a neck portion projecting from said actuator housing and extending through said opening in said mounting surface, said arm of said bayonet coupling means extending radially outwardly from said neck portion and being spaced from said actuator housing, said mounting surface being engaged between said arm and said actuator housing.

7. An assembly as set forth in claim 6, wherein said arm has an inclined surface facing said actuator housing for providing an increasing biasing force of said actuator housing against said mounting surface as said actuator is rotated from said first orientation to said second orientation.

8. An assembly as set forth in claim 7, wherein said opening in the mounting surface includes a first section of increased radius for allowing insertion of said neck portion through said opening in said mounting surface and said arm through said first section when said actuator is in said first orientation.

9. An assembly as set forth in claim 8, further characterized by including locking means for locking said first and second bayonet coupling means from relative rotation when said actuator is in said second orientation.

10. An assembly as set forth in claim 9, wherein said locking means includes a second section of increased radius in said opening of said mounting surface and a tab extending radially outwardly from said neck portion for engaging an abutment surface of said second section when said actuator is in said second orientation, said abutment surface facing opposite to the direction of rotation of said actuator when moving from said first orientation to said second orientation, said first section including a shoulder and said locking means further including at least one detent extending from the actuator housing for engaging the shoulder when said actuator is in said second orientation, said shoulder facing in the direction of rotation of said actuator when moving from said first orientation to said second orientation, said locking means thereby engaging oppositely facing surfaces to prevent rotation of said actuator relative to said mounting surface and said valve.

11. An assembly as set forth in claim 10, wherein said first connection part includes a terminal portion of said rod having an opening therethrough and said second connector part includes a hook shaped arm extending from said valve having a body portion and an end portion, said end portion of said hook shaped arm being substantially perpendicular relative to said rod when said actuator is in said first orientation, said arm being spaced 30° from said first recess and said detent being spaced 90° from said shoulder and said tab being spaced 90° from said abutment surface.

12. An assembly as set forth in claim 11, wherein said end portion of said hook shaped arm extends partially through said opening in said terminal portion and said arm mates with said first section and said detent and said tab are spaced 60° from said shoulder and said abutment surface when said actuator is in said intermediate orientation.

13. An assembly as set forth in claim 4, wherein said valve includes a longitudinal axis and is mounted for rotation relative to said assembly about said longitudinal axis.

14. An assembly as set forth in claim 13 wherein said air flow housing includes an air flow chamber having at least one port extending therethrough, said valve being mounted on said air flow housing for rotation about said longitudinal axis to selectively open and close said port to air flow.

15. An assembly as set forth in claim 14, wherein said actuator is mounted outside of said air flow housing, said driven rod extending through said opening in said mounting surface and into said air flow chamber.

16. An air flow valve actuator assembly for actuating movement of an air flow valve between an opened and closed condition, said assembly comprising: a driven rod including a terminal portion having an opening extending therethrough for connection to an air flow valve, and the improvement comprising rotationally actuated first bayonet coupling means for connecting said assembly to a second bayonet coupling means on a mounting surface, swivel means for connecting said driven rod to said assembly and effecting swiveling movement of said driven rod relative to said assembly, an actuator housing having an inner chamber and a diaphragm separating said inner chamber into two compartments and including a first fluid passageway in fluid communication with a first of said compartments, said rod being connected to said diaphragm and extending through and out from a second of said two compartments, said rod being axially movable with said diaphragm, said actuator housing including a second fluid passageway in fluid communication with said second compartment and boot means for perfecting a flexible seal between said actuator housing and said rod while allowing swiveling and axial movement of said rod relative to said actuator housing.

17. An assembly as set forth in claim 16, wherein said first bayonet coupling means includes at least one arm for engaging the mounting surface and drawing said actuator housing against the mounting surface.

18. An assembly as set forth in claim 17, wherein said first bayonet coupling means includes a neck portion projecting from said actuator housing for extending through the mounting surface, said arm extending radially outwardly from said neck portion and being spaced from said actuator housing.

19. An assembly as set forth in claim 18 wherein said arm includes an inclined surface facing said actuator housing.

20. An assembly as set forth in claim 19 including at least one tab extending radially outwardly from said neck portion and at least one detent extending from the actuator housing.

21. An assembly as set forth in claim 20 including a terminal member connected to said rod and defining said terminal portion of said rod.

* * * * *